United States Patent [19]

Ogasahara

[11] Patent Number: 5,242,473
[45] Date of Patent: Sep. 7, 1993

[54] APPARATUS FOR DEHUMIDIFYING GAS

[75] Inventor: Minoru Ogasahara, Osaka, Japan

[73] Assignee: Unico Kogyo Kabushiki Kaisha, Osaka, Japan

[21] Appl. No.: 832,621

[22] Filed: Feb. 12, 1992

Related U.S. Application Data

[63] Continuation of Ser. No. 656,120, Feb. 14, 1991, abandoned, and a continuation-in-part of Ser. No. 409,692, Feb. 14, 1991, abandoned.

[30] Foreign Application Priority Data

Sep. 22, 1988 [JP] Japan .............. 63-124088[U]

[51] Int. Cl.$^5$ .............................................. B01D 53/06
[52] U.S. Cl. ...................................... 96/125; 96/146
[58] Field of Search ................... 55/31, 33, 34, 60, 74, 55/75, 78, 179–181, 387, 389, 390, 208

[56] References Cited

U.S. PATENT DOCUMENTS

| | | | |
|---|---|---|---|
| 3,490,201 | 1/1970 | Colvin et al. | 55/31 |
| 3,841,058 | 10/1974 | Templeman | 55/33 |
| 3,844,737 | 10/1974 | Macriss et al. | 55/390 X |
| 4,134,743 | 1/1979 | Macriss et al. | 55/390 X |
| 4,168,149 | 9/1979 | Armond et al. | 55/179 X |
| 4,233,038 | 11/1980 | Tao | 55/33 |
| 4,398,927 | 8/1983 | Asher et al. | 55/34 |
| 4,402,717 | 9/1983 | Izumo et al. | 55/390 X |
| 4,636,225 | 1/1987 | Klein et al. | 55/31 |
| 4,711,645 | 12/1987 | Kumar | 55/31 X |
| 4,769,053 | 9/1988 | Fischer, Jr. | 55/181 X |

FOREIGN PATENT DOCUMENTS

| | | | |
|---|---|---|---|
| 0256726 | 5/1988 | German Democratic Rep. | 55/31 |
| 62-148330 | 9/1987 | Japan . | |
| 2055609 | 3/1981 | United Kingdom | 55/31 |

Primary Examiner—Robert Spitzer
Attorney, Agent, or Firm—Birch, Stewart, Kolasch & Birch

[57] ABSTRACT

A gas dehumidifying apparatus including a dehumidifier rotor wherein the rotor is of a composite construction which is compatible with both high humidity and low humidity conditions and in which proper temperature conditions can be obtained in connection with the regeneration of the adsorbent to thereby improve the adsorption performance of the rotor. The apparatus exhibits improved dehumidification efficiency and thus can provide treated gas with a dryness level higher than conventionally attainable.

18 Claims, 7 Drawing Sheets

APPARATUS FOR DEHUMIDIFYING GAS

This application is a continuation of application Ser. Nos. 07/656,120 and 07/409,692 which were filed on Feb. 14, 1991 and Sep. 20, 1989, now abandoned.

BACKGROUND OF THE INVENTION

1. Field of the Invention

This invention relates to a dehumidifying apparatus of the type which removes the moisture contained in gas by causing the moisture to be adsorbed by an adsorbent.

2. Description of Background Art

Dehumidifying apparatuses have been known in the art. One typical example of such apparatus is described in Japanese Utility Model Laid-Open Publication No. 62-148330.

This apparatus is such that, as FIG. 8 shows, the gas to be treated is fed by a fan 30 into a dehumidifier rotor 4e using silica gel as an adsorbent in which the moisture in the gas is adsorbed by the adsorbent. As the adsorbent gains water, its adsorptivity tends to decrease. Therefore, regenerating air heated by a heater 19 is supplied by a fan 31 from a separate position into the rotor 4e for passage therethrough so that the adsorbent is dried for regeneration.

In such an apparatus, the material of the dehumidifier rotor 4e has an important bearing upon the performance of the apparatus. For the rotor 4e, various materials, such as activated charcoal, lithium chloride, silica gel, and synthetic zeolite, have previously been used as desired.

The adsorptive characteristics of the dehumidifier rotor 4e vary according to the material of which the rotor is made, and as a matter of practice, only one particular material which may be considered most suitable according to humidity and other conditions of the air to be treated is selected for incorporation into the apparatus.

SUMMARY OF THE INVENTION

With the above described prior art arrangement, however, it is difficult to properly select an adsorbent compatible with the humidity conditions of the air to be treated. In addition, the prior art arrangement involves the following problems.

Silica gel, for example, exhibits excellent hygroscopic characteristics when the air to be treated is highly humid, but when the moisture content of the air is low, the hygroscopicity of silica gel is considerably reduced. On the other hand, synthetic zeolite exhibits excellent dehumidifying performance when the air to be treated is of low moisture condition, but it is not suitable for dehumidification purposes when the moisture content of the air is high. Different adsorbents for dehumidifier rotors have their respective merits and disadvantages in this way. Therefore, when there is a change in the humidity condition of the air to be treated, they can no longer provide good dehumidification, and in addition, their hygroscopic capabilities are subject to certain limitations.

In order to provide increased dehumidification efficiency, it may be conceivable to increase the thickness t of the dehumidifier rotor. However, this involves the problem that when regenerating air is supplied to the dehumidifier rotor, the temperature of the regenerating air becomes lower in proportion as the air approaches the outlet of the rotor, it being thus impossible to regenerate the adsorbent. For example, if regenerating air is supplied in a temperature range of 180° C. to 250° C. which is suitable for regeneration of a synthetic zeolite adsorbent, the temperature of the regenerating air may become lowered on the order of one hundred and several tens of degrees centigrade in a rear portion of the dehumidifier rotor, with the result that the adsorbent present in that portion cannot be regenerated. Therefore, it is impractical to improve the dehumidifying capability of the dehumidifier rotor beyond a certain level, even if the thickness t of the rotor is increased.

Therefore, it is an object of the invention to achieve greater dehumidification efficiency than in the prior art without being greatly influenced by the humidity and other conditions of the air to be treated, thereby dehumidifying the air to a dryness level that is much higher than conventionally attainable.

This objective can be accomplished by providing a dehumidifier rotor of a composite construction which is compatible with both high humidity and low humidity conditions and providing proper temperature conditions in connection with the regeneration of the adsorbent to thereby improve the adsorption performance of the dehumidifier rotor.

Thus, in accordance with the invention, there is provided an apparatus for dehumidifying gas wherein a gas feed pipe 11 for supplying a stream of gas to be treated to a rotatable dehumidifier rotor 4 is connected to one side of the dehumidifier rotor 4 as viewed in the longitudinal direction thereof and a regenerating gas feed pipe 17 for supplying a stream of heated gas for adsorbent regeneration to the dehumidifier rotor 4 is connected to the other side of the rotor 4 via a route different from the route for supply of the gas to be treated, comprising the dehumidifier rotor 4 consisting essentially of a first dehumidifier rotor 4a using silica gel as an adsorbent and a second dehumidifier rotor 4b using synthetic zeolite as an adsorbent, the two dehumidifier rotors 4a, 4b being connected in series, the to-be-treated gas feed pipe 11 being connected to the first dehumidifier rotor 4a, the regenerating gas feed pipe 17 being connected to the second dehumidifier rotor 4b.

According to another aspect of the invention, there is provided an apparatus for dehumidifying gas including two dehumidifier columns 45, 45a arranged in parallel to which a stream of gas to be treated and a stream of adsorbent regenerating gas are supplied in such a way that the supply of the gas to be treated and the supply of the adsorbent regenerating gas can be switched over from one to the other so as to permit the adsorbent regenerating gas to be supplied to one of the dehumidifier columns 45 when the gas to be treated is supplied to the other column 45a, wherein each of said dehumidifier columns 45, 45a consist essentially of a first dehumidifier vessel 46; 46a using silica gel as an adsorbent and a second dehumidifier vessel 47; 47a using synthetic zeolite as an adsorbent, the two dehumidifier vessels 46, 47; 46a, 47a being stacked in series, and wherein the gas to be treated is supplied from the first dehumidifier vessel 46, 46a of each said dehumidifier column 45; 45a to the associated second dehumidifier vessel 47, 47a, while the adsorbent regenerating gas is supplied from the second dehumidifier vessel 47, 47a of each said dehumidifier column 45, 45a to the associated first dehumidifier vessel 46, 46a.

According to the arrangement of the first mentioned dehumidifying apparatus of the invention, the gas to be treated which is supplied through the associated pipe 11 is first passed through the first dehumidifier rotor 4a using the silica gel adsorbent and then through the second dehumidifier rotor 4b using the synthetic zeolite adsorbent, the gas being dehumidified in the course of its passage through the rotors. A larger part of the moisture content of the gas is removed by adsorption during the passage of the gas through the first dehumidifier rotor 4a because the silica gel adsorbent used in the rotor 4a exhibits excellent adsorption performance when the gas is highly humid. The synthetic zeolite adsorbent in the second dehumidifier rotor 4b is unsuitable for the dehumidification of a high humidity gas, but is suitable for the purpose of dehumidifying a low humidity gas. Therefore, the gas which has been demoisturized by the silica gel adsorbent to a low humidity level can be efficiently dehumidified by the synthetic zeolite adsorbent.

When regenerating the adsorbents in the first and second dehumidifier rotors 4a, 4b, it is necessary that the regenerating temperature for the silica gel adsorbent be set lower than the regenerating temperature for the synthetic zeolite adsorbent in order to enhance the efficiency of adsorbent regeneration. The heated gas supplied for regeneration purposes is first passed through the second dehumidifier rotor 4b using the synthetic zeolite adsorbent and then through the first dehumidifier rotor 4a. Accordingly, the temperature of the heated gas is lowered in the course of passage of the gas through the second dehumidifier rotor 4b so that the adsorbent in the first dehumidifier rotor 4a is properly regenerated under lower temperature conditions than the adsorbent in the second dehumidifier rotor 4b. Thus, the silica gel and synthetic zeolite adsorbents can be restored in their adsorptivity to a satisfactory level.

In the second mentioned dehumidifying arrangement of the invention, dehumidification of the gas to be treated is first carried out in each of the first dehumidifier vessels 46, 46a using a silica gel adsorbent and then in each of the second dehumidifier vessels 47, 47a using a synthetic zeolite adsorbent, in same manner as in the first mentioned apparatus. Therefore, satisfactory dehumidification performance can be obtained. Further, the process of adsorbent regeneration is carried out by passing the regenerating gas first through each of the second dehumidifier vessels 47, 47a and then through each of the first dehumidifier vessels 46, 46a, and accordingly good regenerating efficiency can be obtained as is the case with the first mentioned apparatus.

As stated above, the arrangement according to the invention is such that a mass of synthetic zeolite adsorbent is placed in a stage subsequent to the stage of operation with a mass of silica gel adsorbent so that the gas to be treated is passed first through the stage of operation with the silica gel adsorbent. Therefore, a larger part of the moisture content of the gas is effectively removed through adsorption by the silica gel adsorbent which is well capable of dehumidifying high humidity gases and, thereafter, the moisture still present in the gas is adequately removed through adsorption by the synthetic zeolite adsorbent which is well capable of dehumidifying low humidity gases. Thus, as compared with any conventional arrangement in which silica gel or synthetic zeolite is used alone, the arrangement of the invention permits a more appropriate and more effective dehumidifying operation with respect to streams of gas to be treated which are of a wider temperature range, so that considerable improvement can be achieved in the dryness of finally dehumidified gas over the prior art level.

Furthermore, according to the invention, a stream of regenerating heated gas is supplied into the adsorbent regenerating process first from the synthetic zeolite side that requires higher temperatures for regeneration than the silica gel, so that when the regenerating heated gas reaches the site in which silica gel is present after having passed through the stage of synthetic zeolite regenerating, the temperature of the regenerating gas has been lowered to a temperature level suitable for regeneration of the silica gel. Therefore, the regeneration of the both adsorbents can be efficiently and properly carried out, with the result that greater dehumidification effect can be achieved.

DETAILED DESCRIPTION OF THE PREFERRED EMBODIMENTS

Preferred embodiments of the invention will now be described in detail.

EMBODIMENT NO. 1

Figure 1A:
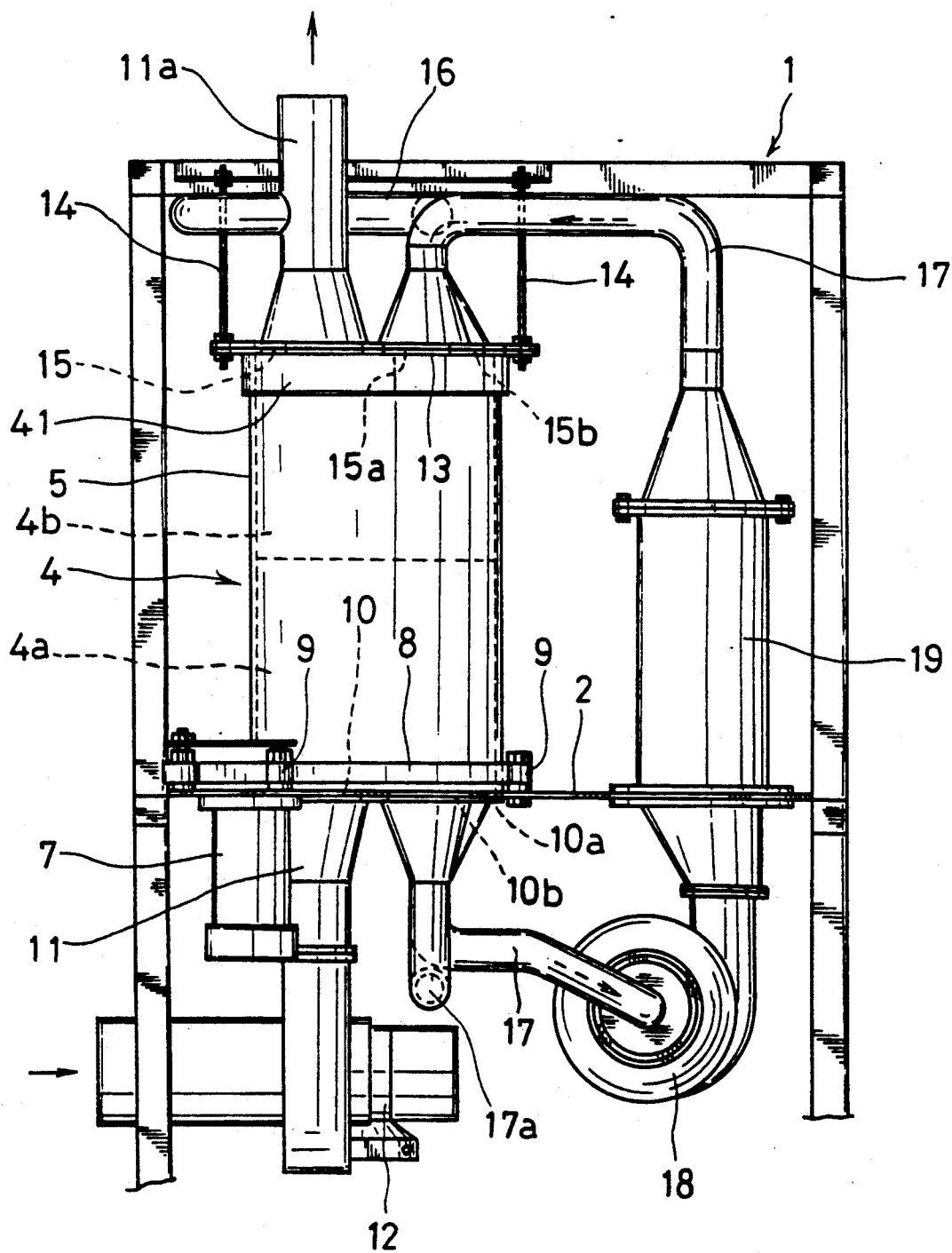
FIG. 1 illustrates a first embodiment of the dehumidifying apparatus according to the invention, FIG. 1(a) being a front view thereof, FIG. 1(b) being a plan view, and FIG. 1(c) being an exploded perspective view showing the construction of a dehumidifier rotor assembly.
Figure 1B:
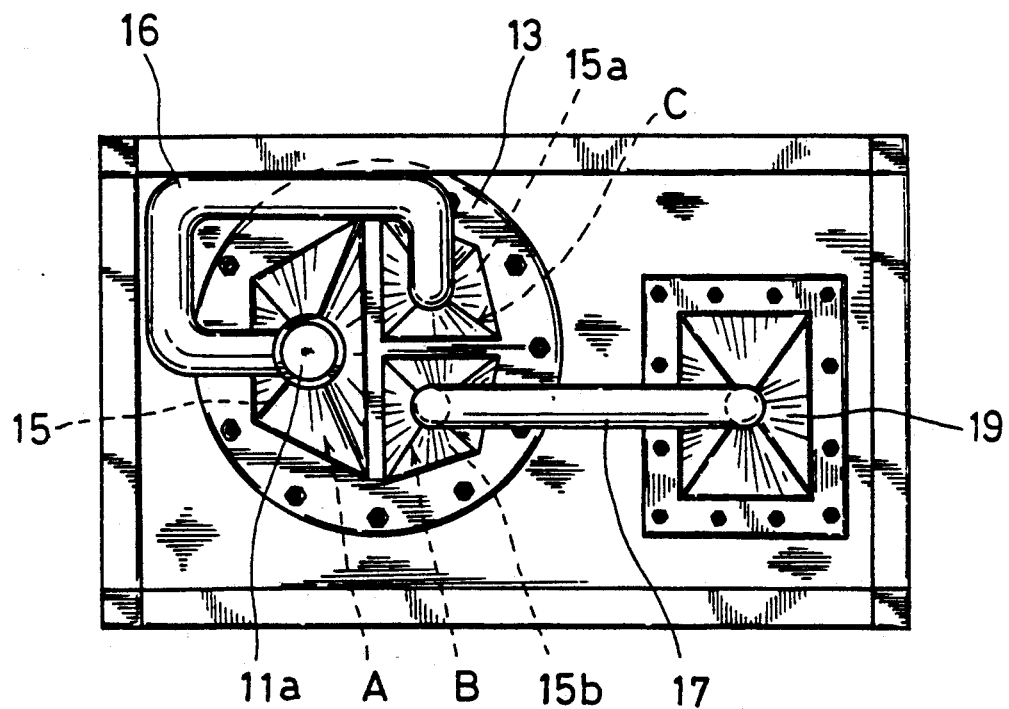
Figure 1:
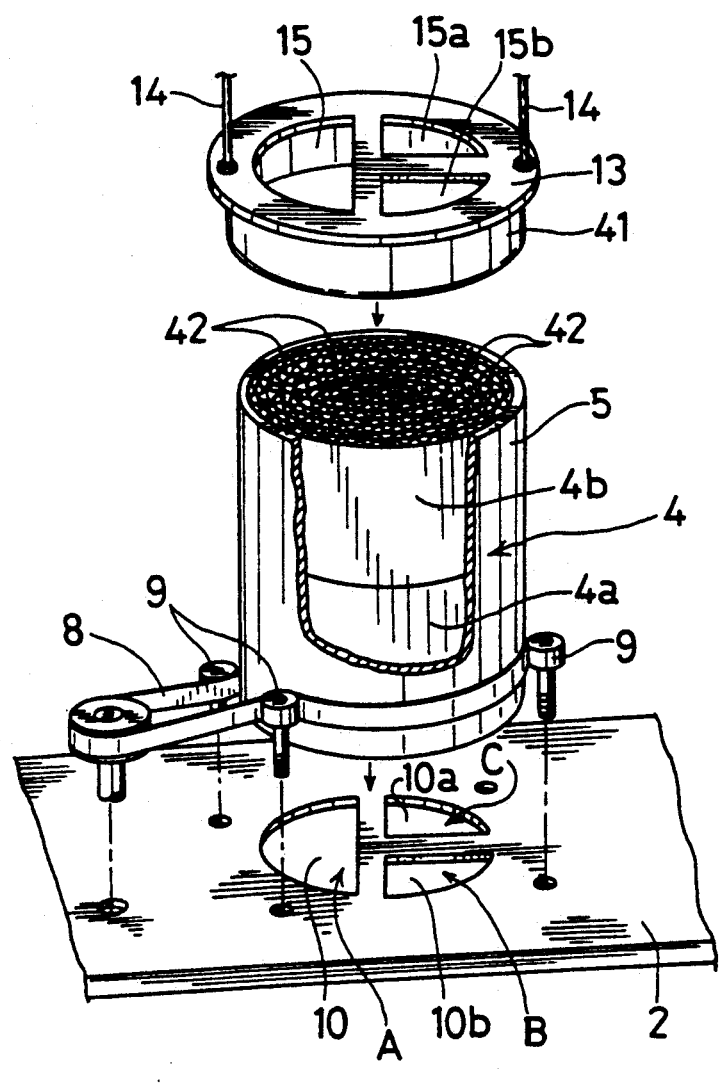

In FIG. 1, a dehumidifier rotor assembly 4 is rotatably mounted on the upperside of a horizontal support plate 2 of a frame 1. The rotor assembly 4 consists of a first dehumidifier rotor 4a using silica gel as an absorbent and a second dehumidifier rotor 4b using synthetic zeolite as an adsorbent which are housed in an outer cylindrical casing 5 in such a way that the two dehumidifier rotors are connected in series, the second rotor being placed on the first rotor. Each of the dehumidifier rotors 4a, 4b is column-shaped and its interior is of a honeycomb construction such that a multiplicity of axially extending through-holes 42 are present therein to render the honeycomb gas-permeable in the axial direction, the honeycomb being impregnated or coated with a silica gel adsorbent or a synthetic zeolite adsorbent, as the case may be.

A timing belt 8 is trained around the outer periphery of a lower part of the dehumidifier rotor assembly 4 so that the rotor assembly 4 is driven to rotate at a predetermined speed by the belt 8 being driven by a motor 7 into a circular run. Around the dehumidifier rotor assembly 4 are arranged a plurality of rollers 9, which prevent possible slack of the belt 8 and guide the rotor assembly 4 so as to prevent any unreasonable horizontal dislocation. The upper side of the dehumidifier rotor assembly 4 is supported in position by being fitted in a cylindrical portion 41 of a support plate 13 supported by the frame 1 through support rods 14, 14.

The support plate 2 on which the dehumidifier rotor assembly 4 is mounted is formed with a semicircular aperture 10 and two sectoral apertures 10a, 10b as shown in FIG. 1(c). Similar apertures 15, 15a, 15b are bored in the upper support plate 13 in the same fashion as the apertures 10, 10a, 10b. Of these apertures, apertures 10, 15 define a dehumidifying zone A in the dehumidifier rotor assembly 4; apertures 10b, 15b define a regenerating zone B; and apertures 10a, 15a define a cooling and regenerating zone C.

A pipe 11 for supply of the gas to be treated is connected to the aperture 10 of the lower support plate 2 which defines the dehumidifying zone A so that external air can be supplied into the dehumidifier rotor assembly 4 through the operation of a fan 12 associated with the pipe 11. Connected to the aperture 15 of the upper support plate 13 is a pipe 11a for discharge of treated gas as dehumidified by being passed through the dehumidifier rotor assembly 4. The pipe 11a extends to a drying oven in which dry air is required and/or any other specified site.

Next, a system for regeneration of the adsorbents in the dehumidifier rotor assembly 4 will be explained. As FIG. 1(b) shows, the pipe 11a has a part thereof branched as a purging pipe 16 connected to the aperture 15a of the upper support plate 13 which defines the cooling and regenerating zone C of the dehumidifier rotor assembly 4. A pipe 17 for supply of adsorbent regenerating gas is connected at one end to the aperture 10a of the lower support plate 2 through which is discharged the air supplied from the purging pipe 16 into the rotor assembly 4. A fan 18 and a heater 19 are provided at intermediate locations on the pipeline 17 so that a stream of gas heated by the heater 19 is supplied again into the dehumidifier rotor assembly 4 through the aperture 15b of the upper support plate 13. A discharge pipe 17a is connected to the aperture 10b of the lower support plate 2, the front end of the discharge pipe being open at a suitable location inside or outside the frame 1.

The construction of the present embodiment is as described above. The manner of operation will now be explained.

Figure 2:
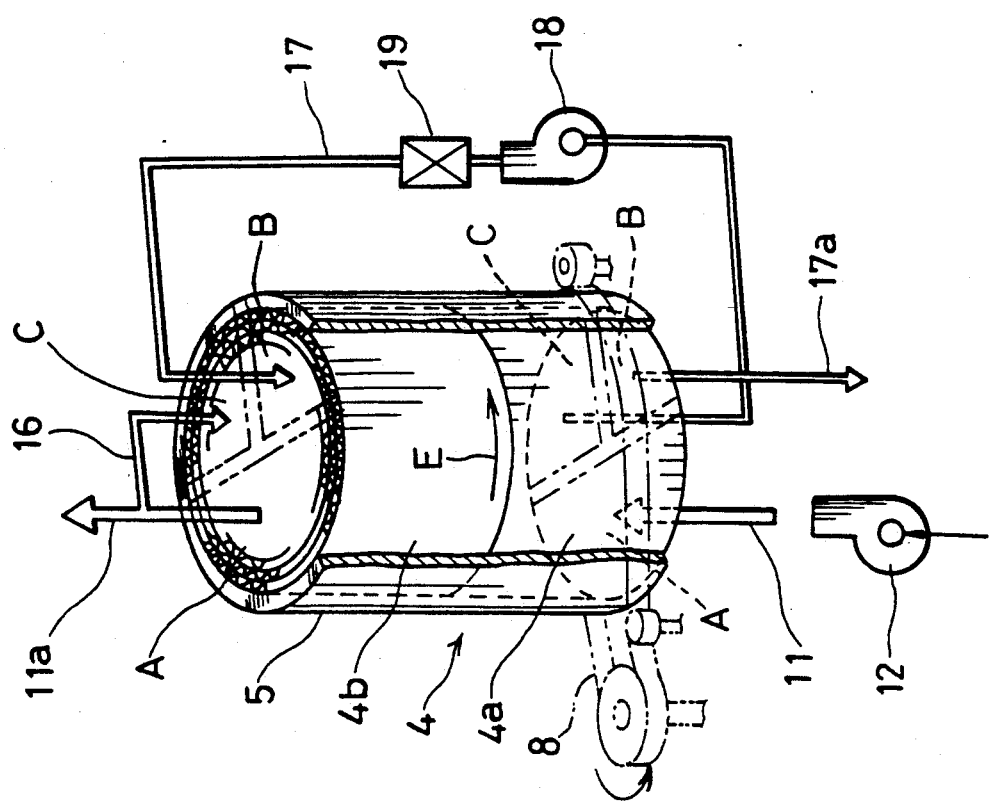
FIG. 2 is an explanatory view showing the process of dehumidifying operation.

The motor 7 is first driven to actuate the belt 8 into a circular run to thereby rotate the dehumidifier rotor assembly 4 in the direction of arrow E as FIG. 2 shows. Simultaneously, the fan 12 is actuated to supply external air through the pipe 11 into the first dehumidifier rotor 4a for passage therethrough. Since the silica gel adsorbent in the first dehumidifier rotor 4a is well capable of dehumidifying air having a large moisture content, a larger part of the moisture contained in the air to be treated is removed by adsorption in the first dehumidifier rotor 4a and accordingly low humidity air is supplied into the second dehumidifier rotor 4b for treatment therein.

The second dehumidifier rotor 4b can display good dehumidifying performance with respect to air having a low moisture content, though it is not well capable of dehumidifying air with a high moisture content. Therefore, a small amount of water remaining in the air which has passed through the first dehumidifier rotor 4a is removed by adsorption substantially completely in the second dehumidifier rotor 4b. That is, a large proportion of the water content of the air is roughly removed first by the silica gel adsorbent and then a small amount of moisture remaining in the air is removed by the synthetic zeolite adsorbent in a minute and adequate manner. Thus, greater dehumidification can be achieved as compared with the case in which silica gel or synthetic zeolite is used alone.

The dry air obtained through the process of dehumidification is discharged through the pipe 11a, and in conjunction therewith a proportion of the dry air is supplied through the purging pipe 16 to the cooling and regenerating zone C of the dehumidifier rotor assembly 4 for passage therethrough. The air which has passed through zone C is subsequently heated by the heater 19 as it passes through the pipe 17 under the action of the fan 18 and is, in turn, supplied into the other regenerating zone B of the dehumidifier rotor assembly 4. The rotation of the dehumidifier rotor assembly 4 in the direction of arrow E is such that a given site of the adsorbent, after its passage through the dehumidifying zone A, moves to the regenerating zone B and then to the cooling and regenerating zone C.

When the adsorbent that has adsorbed a large amount of moisture in the dehumidifying zone A reaches the regenerating zone B, a stream of air heated by the heater 19 to, for example, temperatures of about 180° to 250° C., a temperature range most suitable for regeneration of synthetic zeolite adsorbent, is supplied to that zone and thus regeneration of the adsorbent is properly carried out. As the regenerating air passes through the second dehumidifier rotor 4b, the temperature of the air is lowered. In this connection, from the standpoint of regenerating efficiency it is preferred that the temperature for regeneration of the silica gel adsorbent in the first dehumidifier rotor 4a be lower than that for regeneration of the synthetic zeolite adsorbent, or in the vicinity of 150° C., for example. Therefore, the regenerating air supplied at a temperature suitable for regeneration of the second dehumidifier rotor 4b is also suitable for regeneration of the silica gel adsorbent as its temperature is reduced to a temperature level suitable for that purpose when the air reaches the first dehumidifier rotor 4a. Thus, the regeneration of both silica gel and synthetic zeolite adsorbents can be properly carried out.

Subsequently, when the site of the adsorbent regenerated as above reaches the cooling and regenerating zone C, a stream of treated air as demoisturized and dried is supplied into the zone C, demoisturization and regeneration of the adsorbent is further enhanced. The moisture adsorptivity of the adsorbent increases as the temperature of the adsorbent decreases. However, by supplying a stream of treated air of ordinary temperature to the site of the adsorbent which has been heated to a high temperature by regenerating air in the regenerating zone B, the adsorbent can be cooled. Thus, the adsorbent in the dehumidifier rotor which has been subjected to the stages of regeneration by heated air in zone B, and second-stage regeneration and cooling by dry treated air in zone C is restored to an optimum performance level for dehumidification operation in the next zone A, which insures more satisfactory dehumidification of the air to be treated.

The air supplied to the dehumidifier rotor 4 through the purging pipe 16 is subject to a temperature rise under the influence of the adsorption heat due to the increase in the moisture content of the air. This leads to the advantage that the heating load of the heater 19 in the second stage of operation is reduced.

In the above described embodiment, dehumidified air is supplied to the dehumidifier rotor 4 through the purging pipe 16 so that adsorbent regeneration can be carried out more satisfactorily. It is understood, however, that the invention is not limited by such means. The arrangement of pipings may be varied in design as desired.

Figure 3:
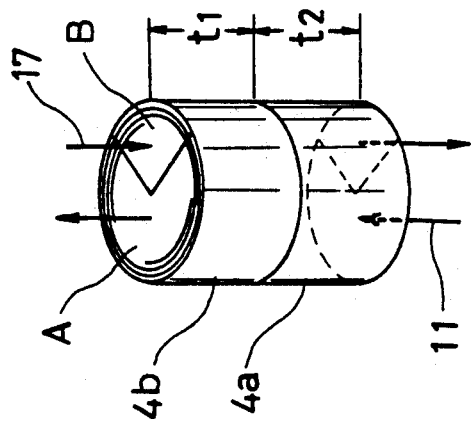

For example, as FIG. 3 shows, the first and second rotors 4a, 4b may be each divided into two zones A, B so that the air to be treated is supplied to the one zone A through the pipe 11, while regenerating air is supplied to the other zone B through the pipe 17.

An experiment was made by employing a dehumidifying apparatus as shown in FIG. 3 under the following conditions. The results obtained are also shown below.

CONDITIONS

Thickness of first dehumidifier rotor 4a:200 mm.
Thickness of second dehumidifier rotor 4b: 200 mm.
Temperature of air to be treated (atmospheric temperature): 30° C.
Water content of air to be treated: 0.011 kg/kg'.
Dew point of air to be treated: 15.5° C.
Heating temperature for regenerating air: 250° C.

RESULTS (TREATED AIR DATA)

Dew point: $-63.8°$ C.
Moisture regain: $3.821 \times 10^{-6}$ kg/kg'.
Temperature: 54.2° C.

For purposes of comparison, an experiment was made with two dehumidifier units using a silica gel adsorbent (of 200 mm thick and of same diameter and sectional configuration as the apparatus used in the above mentioned experiment) connected together, under same conditions as above noted. The results showed that the dew point of the treated air was of the order of $-15°$ C. A dew point of the order of $-60°$ C. of the dry air as obtained by using the apparatus of the invention is a value that cannot be achieved in the case where silica gel or synthetic zeolite is used alone, unless a cooling device is provided in a stage prior to the dehumidifier units. According to the arrangement of the invention, however, the above mentioned value can be achieved without employing any cooling unit.

In the present invention, the respective thicknesses $t_1$, $t_2$ of the dehumidifier rotors 4a, 4b are not particularly specified, and the internal construction of each dehumidifier rotor may be of other than the honeycomb configuration.

Figure 4:
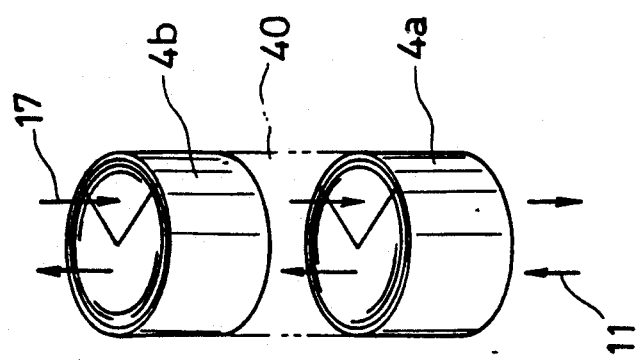
FIGS. 3, 4 and 5 are explanatory views, respectively, showing other forms of the apparatus.

Further, in the invention it is not intended that means for interconnecting the first and second dehumidifier rotors 4a, 4b, be limited to those means described above. For example, separate dehumidifier rotors 4a, 4b may be flange-connected, or they may be integrally connected by adhesive. In addition, as FIG. 4 shows, two rotors 4a, 4b spaced apart from each other may be indirectly connected through a pipe 40. It is only required that they should be connected in series.

Figure 5:
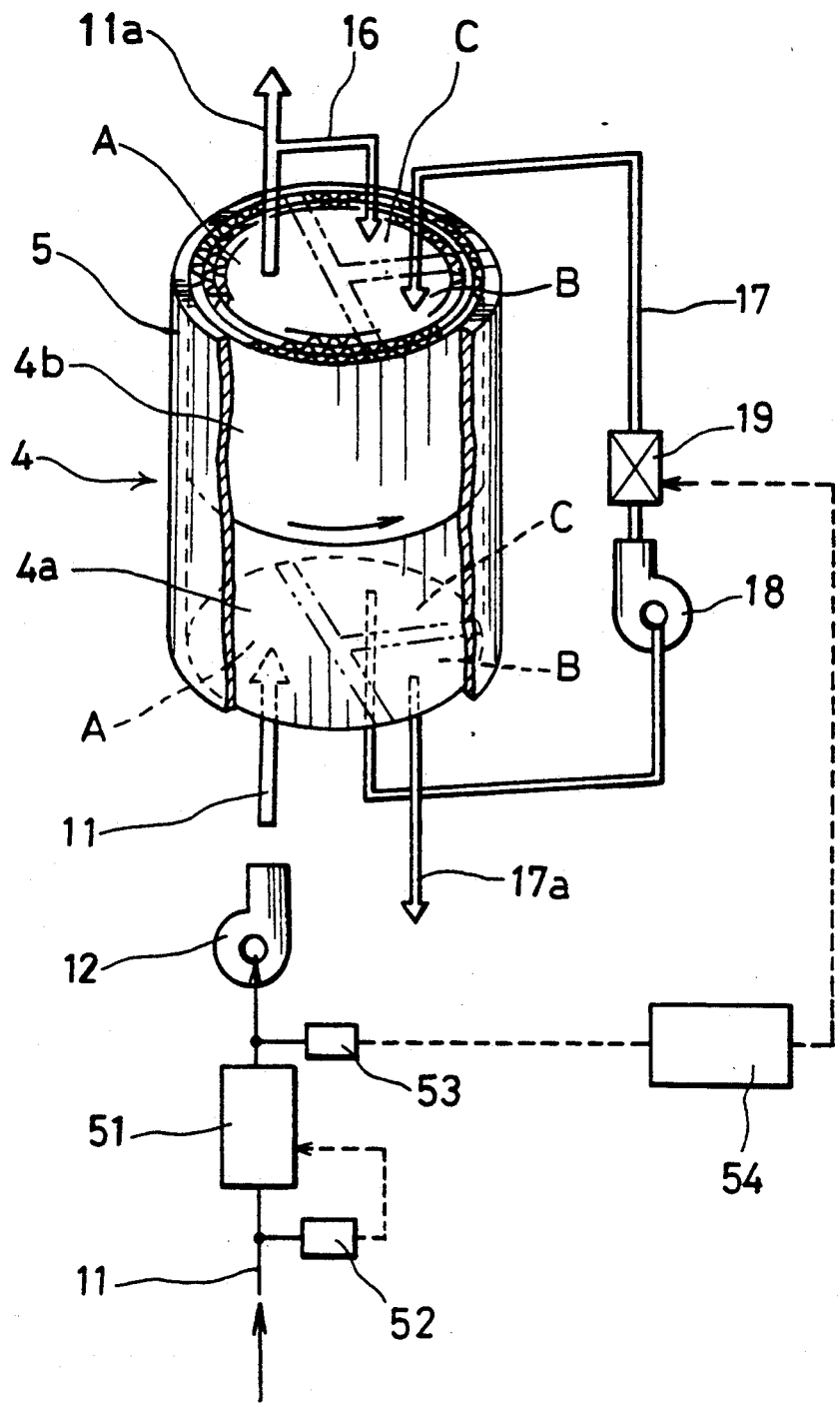

With the above described first embodiment, there may be cases where it is desired that treated air be constantly maintained at or above a desired dryness level without being influenced by the humidity and temperature conditions of the gas to be treated. In such case, means as shown in FIG. 5 may be employed.

The arrangement shown in such that a condenser 51 equipped with a refrigerator is provided on the pipe line 11 for supply of the gas to be treated which is provided with a fan 12 and that sensors 52, 53 for temperature and humidity measurement are arranged before and after the condenser 51. The after-condenser side sensor 53 is connected through a temperature control unit 54 to the heater 19 for heating the regenerating air.

According to such an arrangement, preliminary dehumidification is carried out by the condenser 51 so that the dehumidification burden of the dehumidifier rotor assembly 4 can be reduced. Thus, the dryness of the treated gas which has passed through the dehumidifier rotor assembly 4 can be maintained at or above a specified level. The condenser 51 may be operated according to the absolute moisture regain or the like value measured by the sensor 52 to thereby reduce the power requirement therefor. The heater 19 may be controlled as to the amount of its heat release according to the air temperature and humidity values measured by the sensor 53. When the air that has passed through the condenser 51 is relatively high in temperature or relatively low in humidity, heat release by the heater 19 may be controlled for electric power saving.

EMBODIMENT NO. 2

Figure 6:
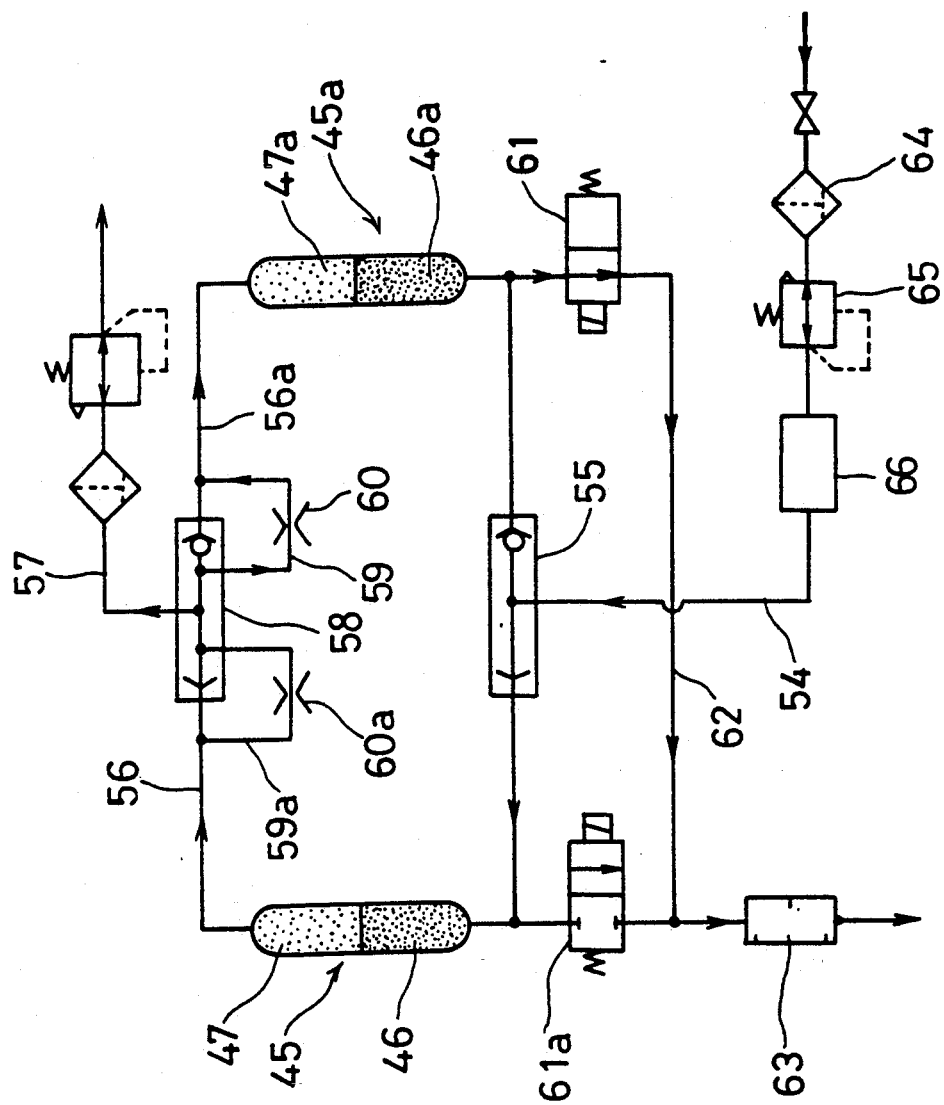
FIGS. 6 and 7 are explanatory views, respectively showing a second embodiment of the invention.
Figure 8:
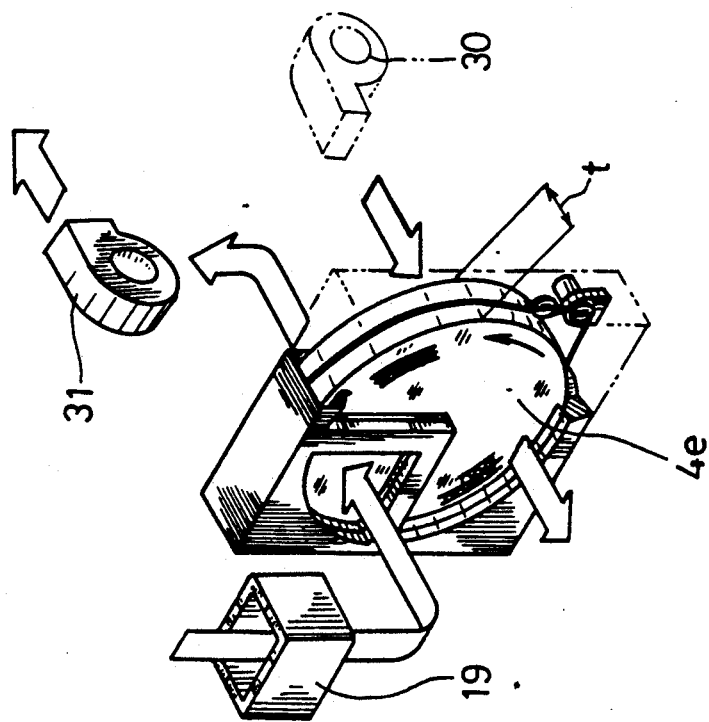
FIG. 8 is an explanatory view showing a prior art arrangement.

As an example of another form of a dehumidifying apparatus, the invention may be embodied in the form of a so-called double column type apparatus which, as FIG. 6 shows, comprises two dehumidifier columns 45, 45a arranged in a parallel relationship.

In the apparatus shown, each of the two dehumidifier columns 45, 45a each comprises a first dehumidifier vessel 46, 46a incorporating a silica gel adsorbent and a second dehumidifier vessel 47, 47a, the two vessels being disposed one over the other.

In this apparatus, the gas to be treated which is supplied to a pipeline 54 equipped with a filter 64, a pressure regulator 65, and a heater 66 is passed through a shuttle valve 55 for supply into one of the dehumidifier columns 45 in which it is dehumidified, and thereafter the air is conducted via pipes 56, 57 to external equipment for utilization of the dehumidified gas. A part of the treated gas passing through the pipe 56 is introduced into the other dehumidifier column 45a through an orifice 60 of a branch pipe 59 connected to the shuttle valve 58. Accordingly, the adsorbent in the dehumidifier column 45a is regenerated, and the gas used for such regeneration is discharged outward through an electromagnetic valve 61, a pipe 62, and a muffler 63.

Figure 7:
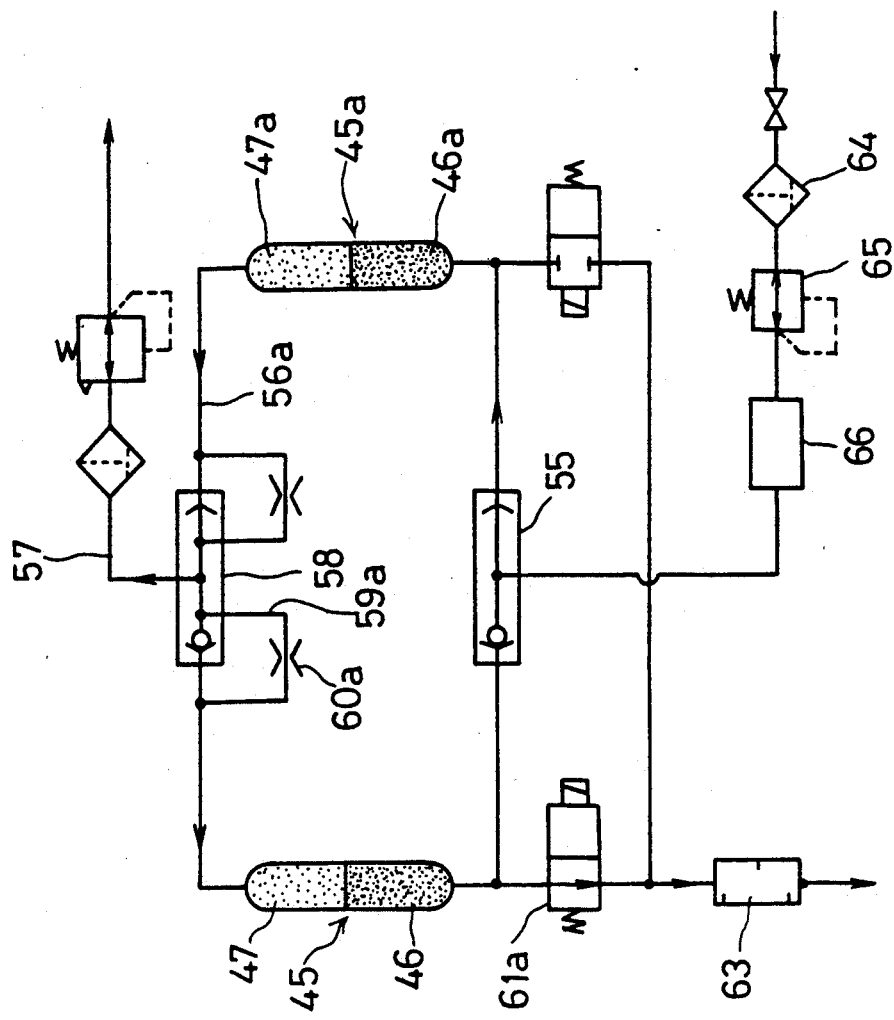

When the solvent in the one dehumidifier column 45 has reached a saturation point, shuttle valves 55, 58 are, as illustrated in FIG. 7, switched over from one to the other for feeding the to-be-treated gas to the other dehumidifying column 45a for dehumidification therein. Dry gas that has passed through the dehumidifier column 45a is conducted via pipes 56a, 57 to external equipment where dry gas is to be utilized, but a part of the gas is introduced through an orifice 60a of a branch pipe 59a of the shuttle valve 58 into the other dehumidifier column 45 for regeneration of the adsorbent therein, and thereafter the gas is discharged from the muffler 63 via an electromagnetic valve 61a.

In the above arrangement, a gas dehumidification operation may be repetitively continued by employing the two dehumidifier columns 45, 45a on an alternate basis. The operation of gas dehumidification in the dehumidifier columns 45, 45a, as is the case with the first embodiment, is carried out in such a way that the gas is roughly dehumidified first in the first dehumidifier vessels 46, 46a using the silica gel adsorbent, and thereafter finer dehumidification is carried out in the second dehumidifier columns 47, 47a using the synthetic zeolite adsorbent, dehumidified gas of high dryness being thus obtained. For the purpose of regenerating the adsorbents in the two dehumidifier columns 45, 45a, regenerating gas is introduced first into the second dehumidifier vessels 47, 47a using the synthetic zeolite adsorbent, and therefore, as in the case with the first embodiment, excellent regeneration effects can be obtained.

With respect to the construction of the dehumidifier columns 45, 45a and related piping arrangement, the invention is not limited to the above described embodiment when such a double column type arrangement as exemplified above is employed. The first and second dehumidifier vessels 46, 46a, 47, 47a of the dehumidifier columns 45, 45a may be of honeycomb construction, or they may be such that masses of particulate silica gel and/or synthetic zeolite are placed in two tiers within each vessel.

It is understood that the details of construction and arrangement of various parts shown may be altered, modified, and varied as desired within the spirit and scope of the invention. Particulars such as heating temperatures for regenerating gas, and a manner of use of the apparatus, are not limited in any way, and the gas subject to treatment is not limited to atmospheric air.

What is claimed is:

1. An apparatus for dehumidifying gas comprising:
    a dehumidifier rotor assembly;
    a gas feed pipe for supplying a stream of gas to be dehumidified to said rotor assembly;
    a regenerating gas feed pipe for supplying a stream of heated gas for adsorbent regeneration to said rotor assembly, said regenerating gas feed pipe being connected to the other side of said rotor assembly via a route different from said gas feed pipe; and
    means for cooling and regenerating said rotor assembly with dehumidified gas prior to feeding the same to said regenerating gas feed pipe thereby subjecting the dehumidified gas to a temperature rise thereby enabling a more rapid increase in temperature of gas for further regenerating said rotor assembly;
    said means for cooling and regenerating said rotor assembly supplying a stream of dehumidified gas to said rotor assembly for adsorbent cooling and regeneration after regenerating said rotor assembly with a stream of heated gas supplied from said regenerating gas feed pipe, thereby effectively cooling and regenerating said rotor assembly prior to further dehumidifying a stream of gas;
    said dehumidifier rotor assembly consisting essentially of a first dehumidifier rotor using silica gel as an adsorbent and a second dehumidifier rotor using synthetic zeolite as an adsorbent, the first and second dehumidifier rotors being connected in series;
    wherein said gas feed pipe is connected to the first dehumidifier rotor, and
    said regenerating gas feed pipe is connected to the second dehumidifier rotor.

2. An apparatus for dehumidifying gas as set forth in claim 1, wherein the first and second dehumidifier rotors are of a honeycomb construction such that the honeycomb has a multiplicity of axially extending through-holes.

3. An apparatus for dehumidifying gas as set forth in claim 2, wherein said gas feed pipe is provided with a fan and the regenerating gas feed pipe is provided with a fan and a heater.

4. An apparatus for dehumidifying gas as set forth in claim 1 or 2, wherein the first and second dehumidifier rotors are separate from each other and are housed in superposed relation in a cylindrical casing.

5. An apparatus for dehumidifying gas as set forth in claim 4, wherein a motor-driven belt is trained round the outer periphery of the cylindrical casing so that the cylindrical casing is rotated through the circular movement of the belt.

6. An apparatus for dehumidifying gas as set forth in claim 5, wherein said gas feed pipe is provided with a fan and the regenerating gas feed pipe is provided with a fan and a heater.

7. An apparatus for dehumidifying gas as set forth in claim 4, wherein said gas feed pipe is provided with a fan and the regenerating gas feed pipe is provided with a fan and a heater.

8. An apparatus for dehumidifying gas as set forth in claim 1, wherein said gas feed pipe is provided with a fan and the regenerating gas feed pipe is provided with a fan and a heater.

9. An apparatus for dehumidifying gas comprising:
    a dehumidifier rotor assembly including a first rotor section having a first adsorbent material housed therein and a second rotor section having a second adsorbent material housed therein connected in series and rotatable with said first rotor section;
    a first support plate fitted to said second rotor section;
    a plurality of distinct inlet and outlet zones formed in said first support plate, including a dehumidifying zone, a regenerating zone, and a cooling and regenerating zone each for directing passage of air through said rotor assembly;
    a second support plate for fixedly supporting said rotor assembly, said second support plate including a plurality of distinct inlet and outlet zones directly corresponding to said plurality of zones formed in said first support plate;
    a gas feed pipe operatively connected to the dehumidifying zone of said first rotor section for supplying gas to be treated to said rotor assembly;
    a purging pipe for fluidly connecting the dehumidifying zone of said rotor assembly with the cooling and regenerating zone of said rotor assembly;
    a regenerating gas feed pipe for fluidly connecting the cooling and regenerating zone of said rotor assembly with the regenerating zone of said rotor assembly; and
    a heater member formed in line of said regenerating gas feed pipe for increasing a temperature of air passing therethrough to a temperature range most suitable for regeneration of the second adsorbent material within said second rotor;
    wherein gas to be dehumidified is introduced into said gas feed pipe for sequential passage through the dehumidifying zone of said rotor assembly thereby dehumidifying the gas through two stages of adsorbent material, purging at least a portion of the dehumidified gas by reintroduction through the cooling and regenerating zone for cooling and regenerating said rotor assembly, and heating of the purged gas to a predetermined temperature sufficient for regeneration of the second adsorbent material within the second rotor, said gas being cooled by passage through the second adsorbent material of said second rotor to an optimum temperature for regeneration of the first absorbent material in said first rotor.

10. The apparatus for dehumidifying gas as set forth in claim 9, wherein the first and second rotor sections are of a honeycomb construction such that the honeycomb has a multiplicity of axially extending throughholes.

11. The apparatus for dehumidifying gas as set forth in claim 9, wherein said first rotor section includes silica gel impregnating a honeycomb structure and said second rotor section includes synthetic zeolite impregnating a honeycomb structure.

12. The apparatus for dehumidifying gas as set forth in claim 9, wherein said first and second rotor sections are separate from each other and are housed in a superposed relation in a cylindrical casing.

13. The apparatus for dehumidifying gas as set forth in claim 12, wherein a motor-driven belt is trained around the outer periphery of the cylindrical casing so that the cylindrical casing is rotated through the circular movement of the belt.

14. An apparatus for dehumidifying gas comprising:
- a dehumidifier rotor assembly including a first rotor section having a first adsorbent material housed therein and a second rotor section having a second adsorbent material housed therein connected in series and rotatable with said first rotor section;
- a first support plate fitted to said second rotor section;
- a plurality of distinct inlet and outlet zones formed in said first support plate, including a dehumidifying zone, a regenerating zone, and a cooling and regenerating zone each for directing passage of air through said rotor assembly;
- a second support plate for fixedly supporting said rotor assembly, said second support plate including a plurality of distinct inlet and outlet zones directly corresponding to said plurality of zones formed in said first support plate;
- a gas feed pipe operatively connected to the dehumidifying zone of said first rotor section for supplying gas to be treated to said rotor assembly;
- a purging pipe for fluidly connecting the dehumidifying zone of said second rotor section with the cooling and regenerating zone of said second rotor section;
- a regenerating gas feed pipe for fluidly connecting the cooling and regenerating zone of said first rotor section with the regenerating zone of said second rotor section; and
- a heater member formed in line of said regenerating gas feed pipe for increasing a temperature of air passing therethrough to a temperature range most suitable for regeneration of the second adsorbent material within said second rotor;
- wherein gas to be dehumidified follows a sequential flow upon rotation of said rotor assembly through each zone for dehumidification, cooling and regenerating of said rotor assembly, and further regenerating of said rotor assembly, thereby subjecting the adsorbent materials to optimum temperature and dehumidification conditions for dehumidifying gas and for regeneration of the rotor assembly for repetitive and efficient dehumidifying.

15. The apparatus for dehumidifying gas as set forth in claim 14, wherein the first and second rotor sections are of a honeycomb construction such that the honeycomb has a multiplicity of axially extending throughholes.

16. The apparatus for dehumidifying gas as set forth in claim 14, wherein said first rotor section includes silica gel impregnating a honeycomb structure and said second rotor section includes synthetic zeolite impregnating a honeycomb structure.

17. The apparatus for dehumidifying gas as set forth in claim 14, wherein said first and second rotor sections are separate from each other and are housed in a superposed relation in a cylindrical casing.

18. The apparatus for dehumidifying gas as set forth in claim 17, wherein a motor driven belt is trained around the outer periphery of the cylindrical casing so that the cylindrical casing is rotated through the circular movement of the belt.

* * * * *